(12) United States Patent
Bennett et al.

(10) Patent No.: US 6,782,528 B1
(45) Date of Patent: Aug. 24, 2004

(54) METHOD AND SYSTEM FOR VISUAL PROGRAMMING USING A RELATIONAL DIAGRAM

(75) Inventors: Laura Johnson Bennett, Raleigh, NC (US); Scott Michael Consolatti, Raleigh, NC (US); Christopher Joseph Paul, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 09/595,191

(22) Filed: Jun. 16, 2000

(51) Int. Cl.[7] .................................................. G06F 9/44
(52) U.S. Cl. ...................................................... 717/109
(58) Field of Search .............................. 717/105–109, 717/113; 345/966, 967

(56) References Cited

U.S. PATENT DOCUMENTS

| | | | | |
|---|---|---|---|---|
| 5,537,630 A | | 7/1996 | Berry et al. ................ 395/155 |
| 5,546,519 A | * | 8/1996 | Berry ......................... 345/763 |
| 5,566,294 A | | 10/1996 | Kojima et al. .............. 395/159 |
| 5,651,108 A | | 7/1997 | Cain et al. .................. 395/340 |
| 5,850,548 A | | 12/1998 | Williams .................... 395/701 |
| 5,991,535 A | | 11/1999 | Fowlow et al. ............. 395/702 |
| 6,054,986 A | * | 4/2000 | Kato .......................... 345/763 |
| 6,243,092 B1 | * | 6/2001 | Okita et al. ................ 345/866 |
| 6,263,486 B1 | * | 7/2001 | Boezeman et al. ......... 717/108 |
| 6,286,017 B1 | * | 9/2001 | Egilsson .................... 715/503 |
| 6,336,210 B1 | * | 1/2002 | Taima et al. ............... 717/100 |
| 6,425,120 B1 | * | 7/2002 | Morganelli et al. ........ 717/109 |
| 6,425,121 B1 | * | 7/2002 | Phillips ..................... 717/109 |

FOREIGN PATENT DOCUMENTS

WO     9915959     4/1999     ............. G06F/9/44

OTHER PUBLICATIONS

Research Disclosure Bulletin, Jul. 1998, 411110 "Object Oriented Chain Logic Editor and Execution Module", pp. 984–985.

* cited by examiner

*Primary Examiner*—Wei Zhen
(74) *Attorney, Agent, or Firm*—A. Bruce Clay; Yee & Associates

(57) ABSTRACT

Application software is visually programmed with a relational diagram that is structured in a left-to-right format. Parts/beans of a software application are placed onto the relational diagram to illustrate an inherent visual flow of the application's logic. The relational diagram is further structured by providing a three column workspace for display of the parts/beans of the software application. The three column workspace can be further structured with a center column for placement of a main part/bean. A left most column is also provided for placement of others of the parts/beans which provide input to the main part/bean in the center column. In addition, a right most column is provided for placement of other parts/beans which receive output from the main part/bean in the center column. The application logic can be modified when a user adds at least one of the parts/beans directly to any one of the three columns in the workspace.

18 Claims, 13 Drawing Sheets

METHOD AND SYSTEM FOR VISUAL PROGRAMMING USING A RELATIONAL DIAGRAM

FIELD OF THE INVENTION

This invention relates in general to computer software, and in particular to a method and system for visual programming using a relational diagram that imposes a structured viewport onto the visual program to decrease complexity and increase readability by limiting the amount of visual program the user ever sees at one time.

BACKGROUND OF THE INVENTION

There is currently a problem in the software industry with the complexity and readability of methods of visual programming. For example, IBM VisualAge (trademark of IBM Corp.), has visual programming techniques that use visual connection lines superimposed upon the visual composition which ultimately leads to what is commonly referred to as "visual spaghetti code". It literally becomes like a spider's web of connection lines as the program grows, which may cause the visual program to be unintelligible. Similarly, Sun Java Studio (trademark of Sun Microsystems) uses a method of visual programming utilizing icons with connector lines which ultimately leads to a large circuit board diagram. This method does not scale, and as the size of the program grows, the visual program is not structured enough to avoid complexity and poor readability. Thus, there is a need for a method and system for visual programming using a relational diagram that imposes a structured viewport onto the visual program to decrease complexity and increase readability by limiting the amount of visual program the user ever sees at one time.

SUMMARY OF THE INVENTION

A method, system and computer program product for visually programming software with a relational diagram is provided. A relational diagram is structured in a left-to-right format. Parts/beans of a software application are placed onto the relational diagram to illustrate an inherent visual flow of the application's logic. The structuring of a relational diagram further comprises providing a three column workspace for display of the parts/beans of the software application.

Providing a three column workspace can further comprise providing a center column for placement of a main one of the parts/beans. A left most column is also provided for placement of others of the parts/beans which provide input to the main one of the parts/beans in the center column. In addition, a right most column is provided for placement of still further ones of the parts/beans which receive output from the main one of the parts/beans in the center column. The application logic can be modified when a user adds at least one of the parts/beans directly to any one of the three columns in the workspace.

These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
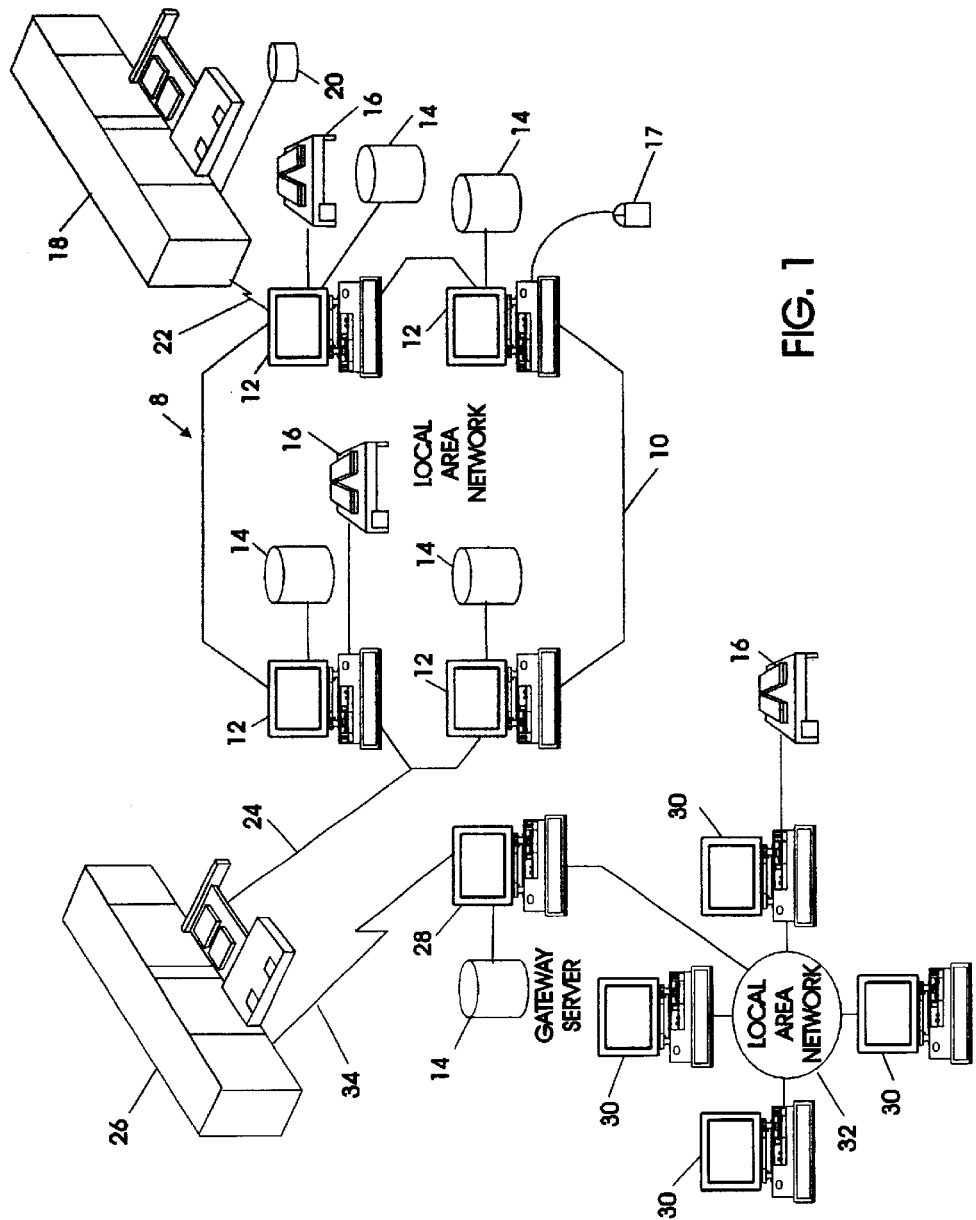
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
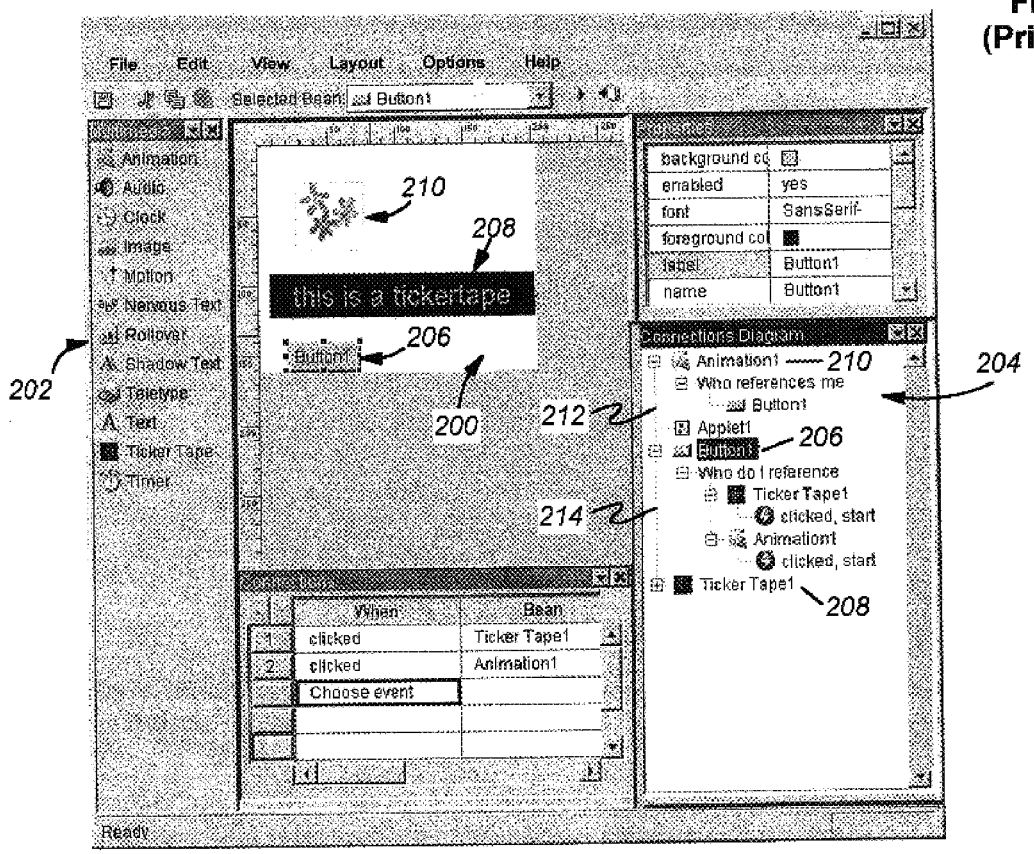
FIG. 2 illustrates an example of a prior art solution.

Referring now to FIG. 2, an example of a prior art solution is shown. This solution allows a user to create applets by first selecting beans from a palette 202 and dropping them on a Composer Panel 200 and second by connecting those beans together using a Connections grid. A Connections Diagram 204 which is an example of a relational diagram displays relationships between the beans contained within the applet. The example Connections Diagram 204 shown in FIG. 2 comprises an applet containing three beans; a button 206, a ticker tape 208 and an animation 210, with two connections 212 and 214 therebetween. This method is read-only and thus, does not allow the user to interact with the relational diagram directly. Instead the user must drop new parts/beans onto the Composer Panel first and then use another window, the Connections grid, to associate event connections. The problems associated with the read-only relational diagram become more apparent when working with a complex layout or parts/beans on the Composer panel, since often parts/beans are positioned directly on top of other parts/beans, obscuring them from view and making selection difficult.

Figure 3:
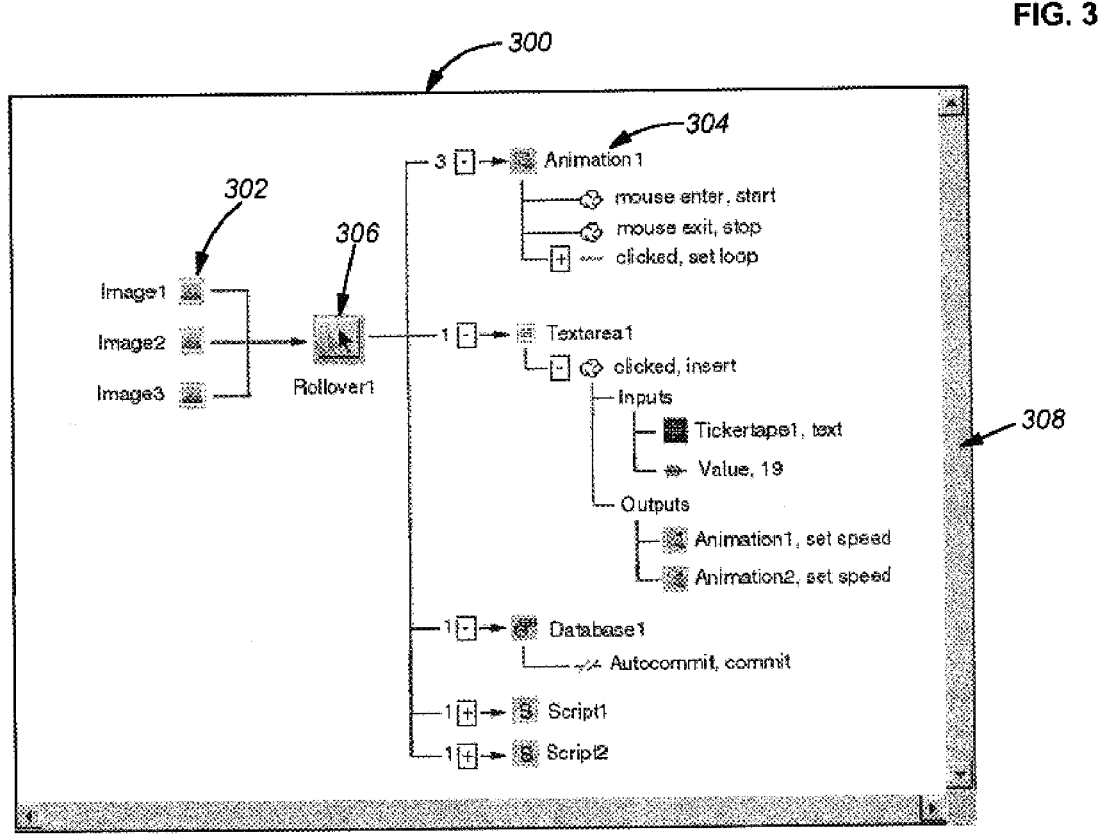
FIG. 3 illustrates an embodiment of the relational diagram of the present invention.
Figure 4:
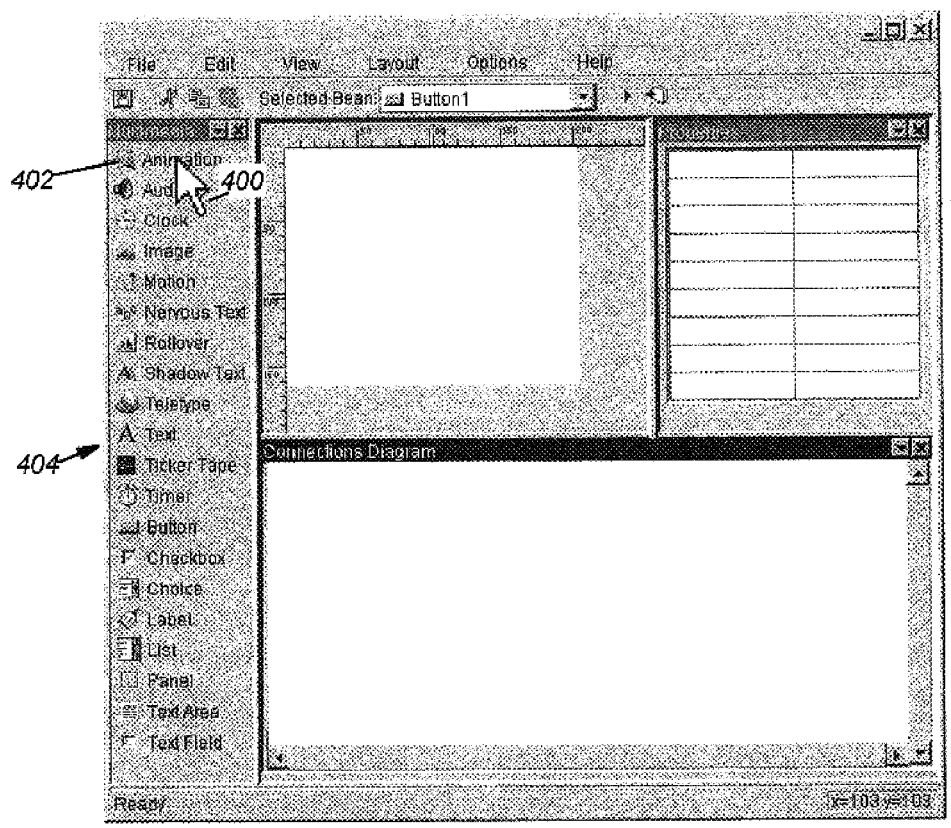
FIGS. 4–11 illustrate the procedure for visual programming using the relational diagram of FIG. 3.
Figure 5:
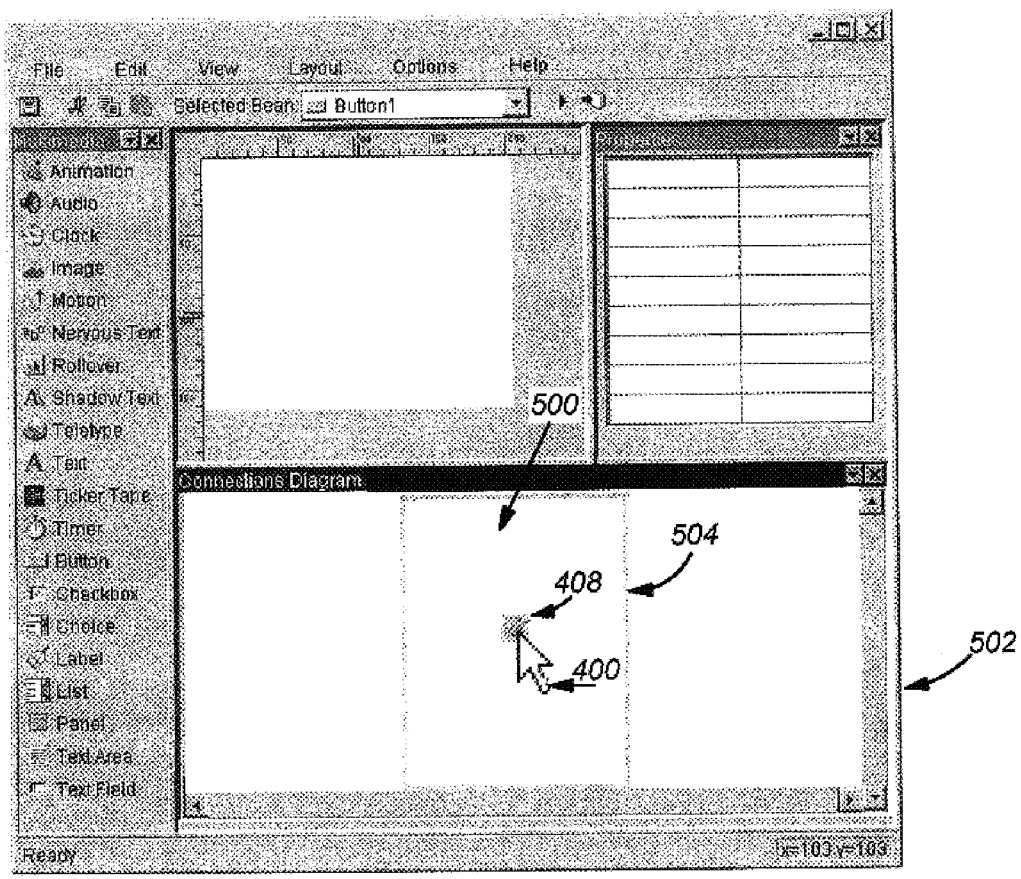
Figure 6:
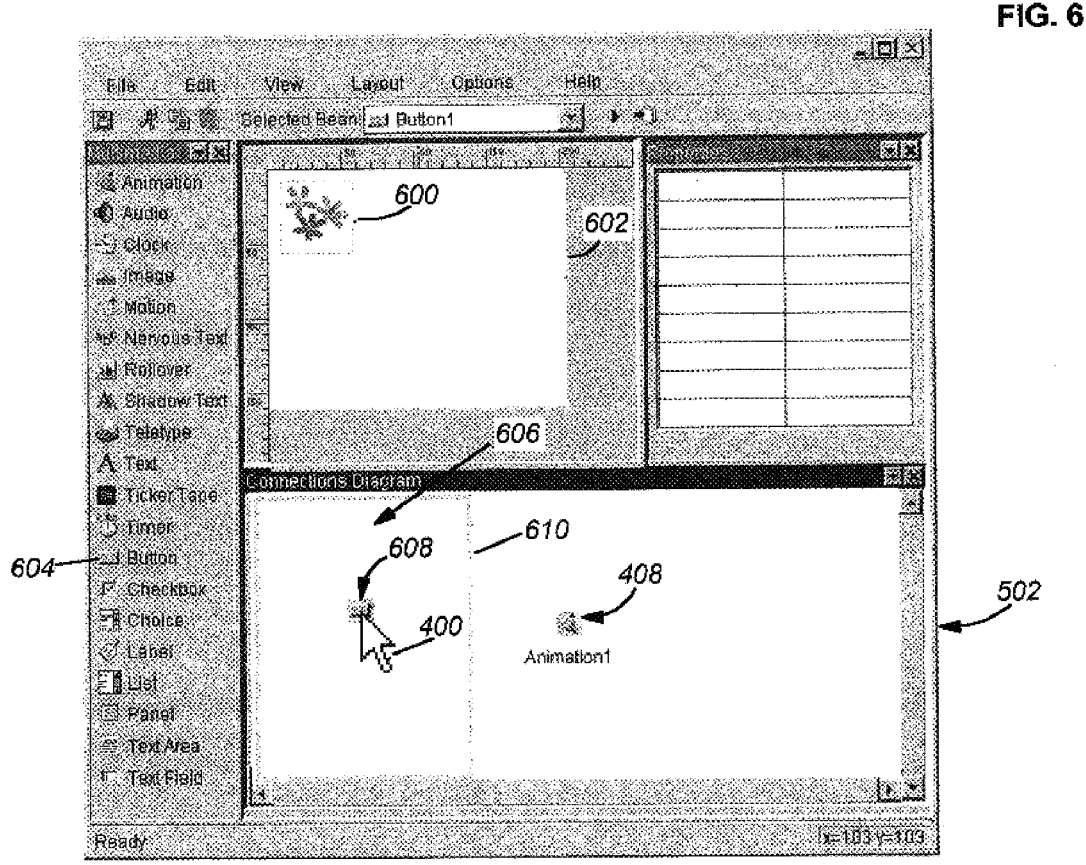
Figure 7:
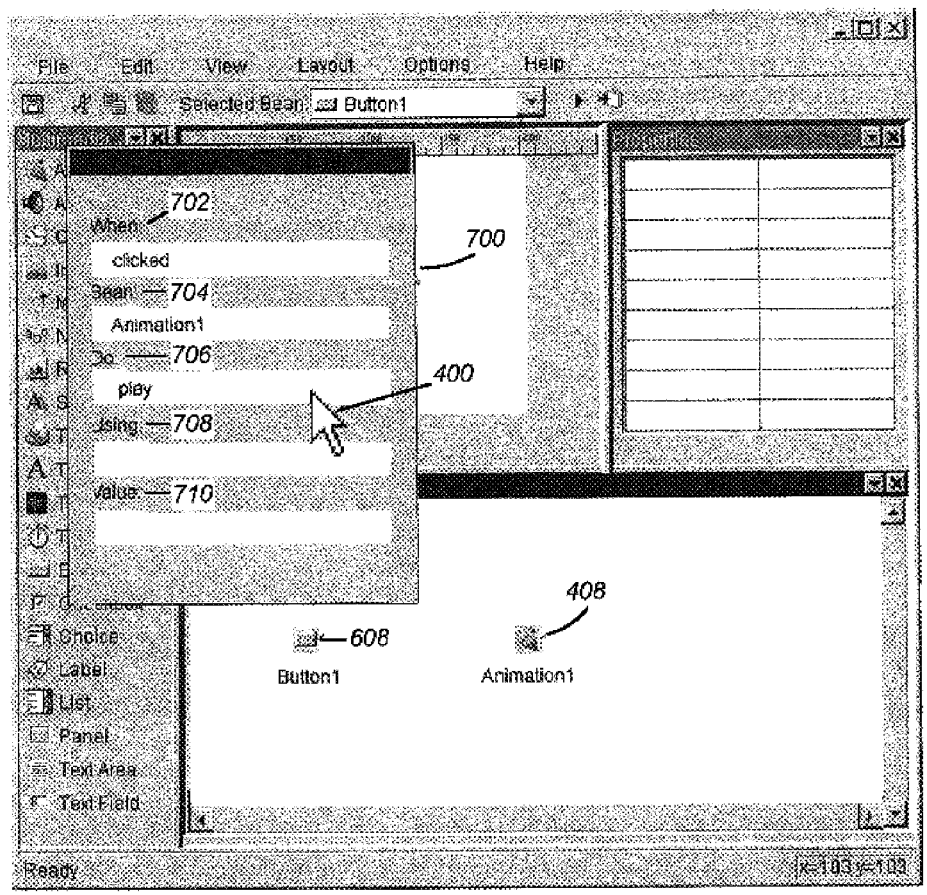
Figure 8:
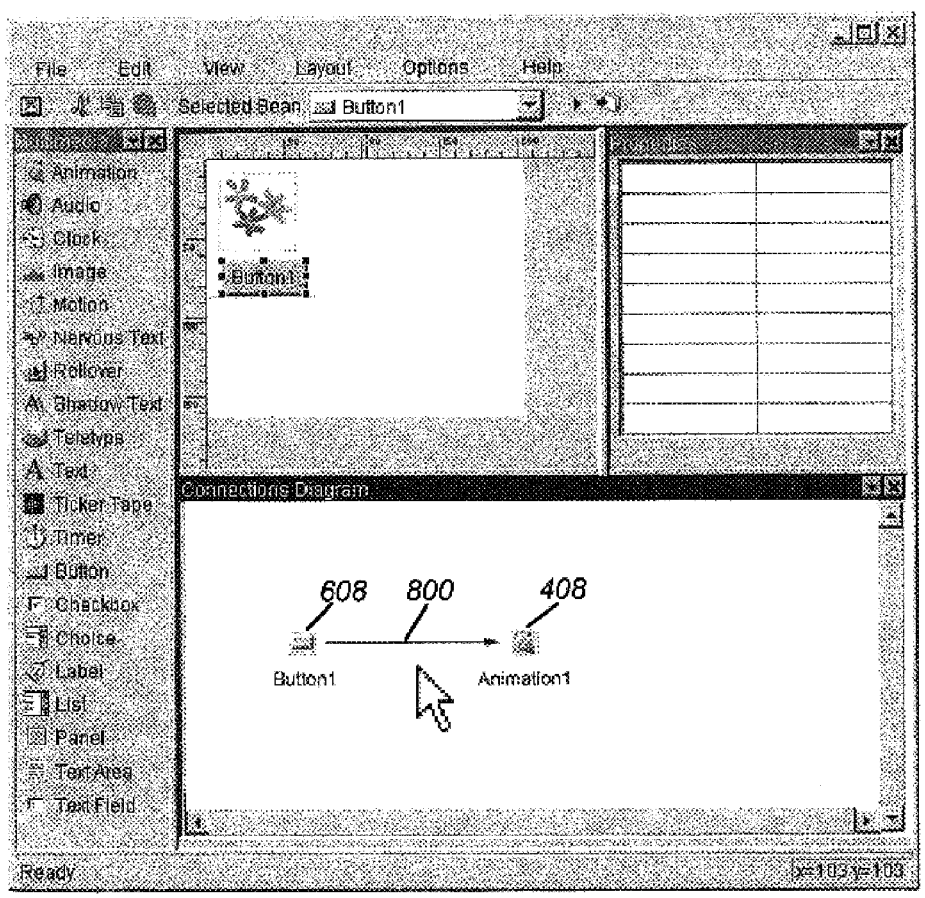
Figure 9:
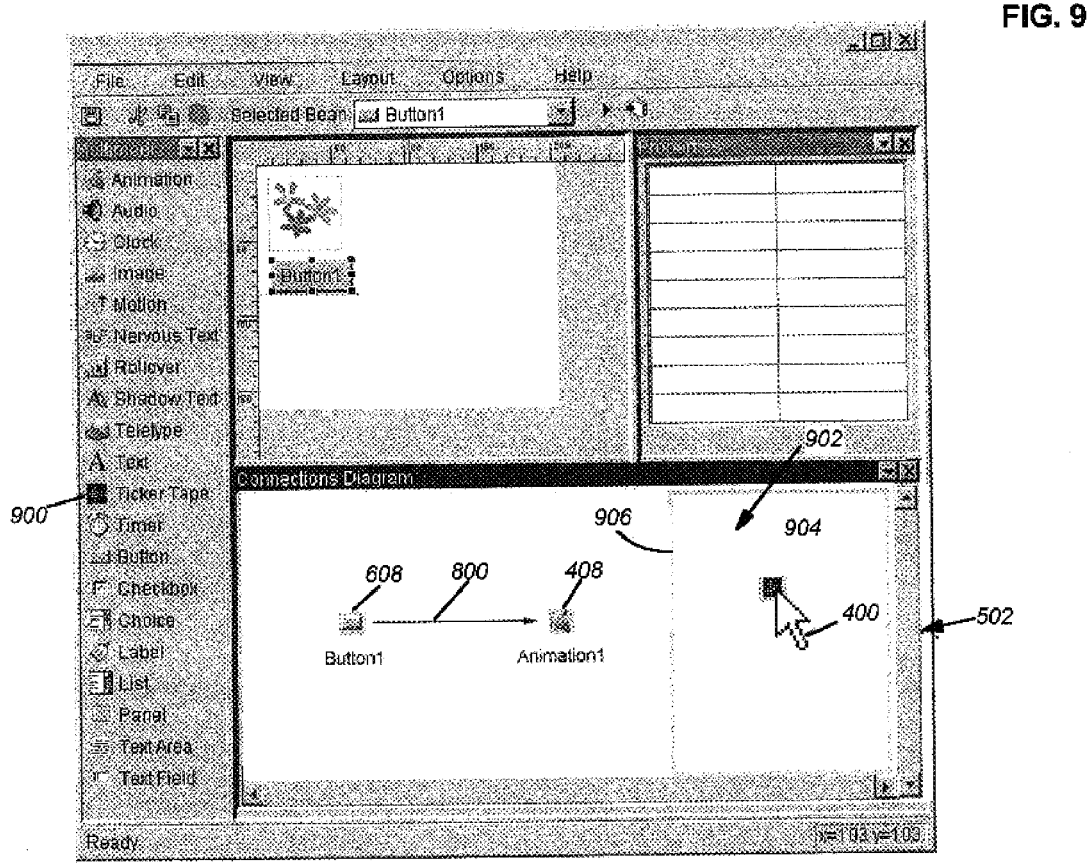
Figure 10:
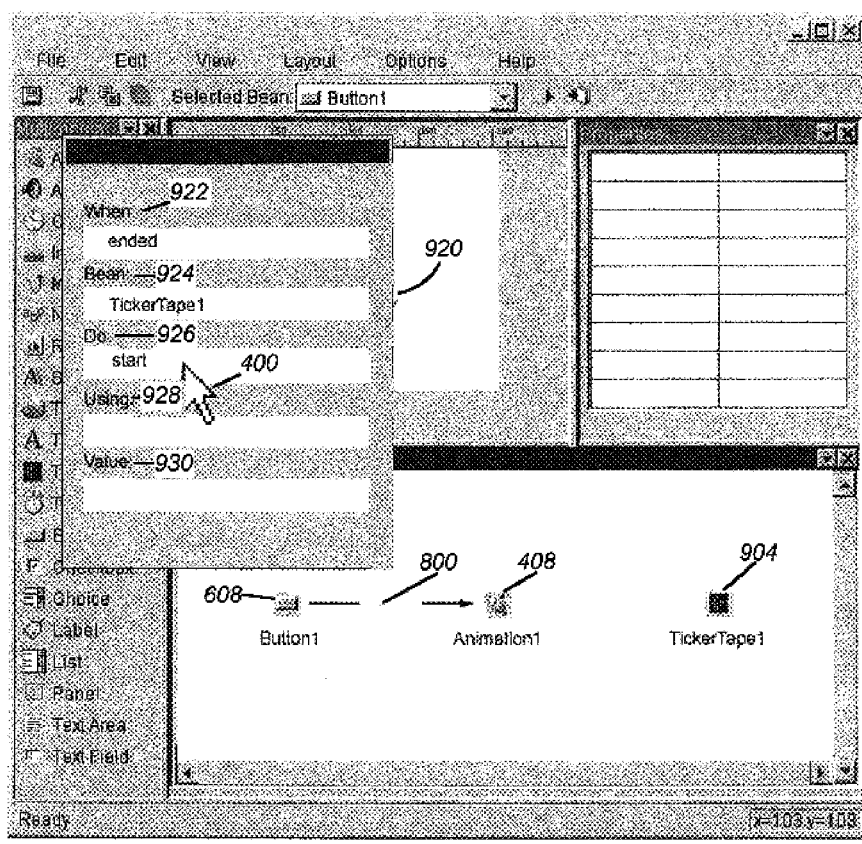
Figure 11:
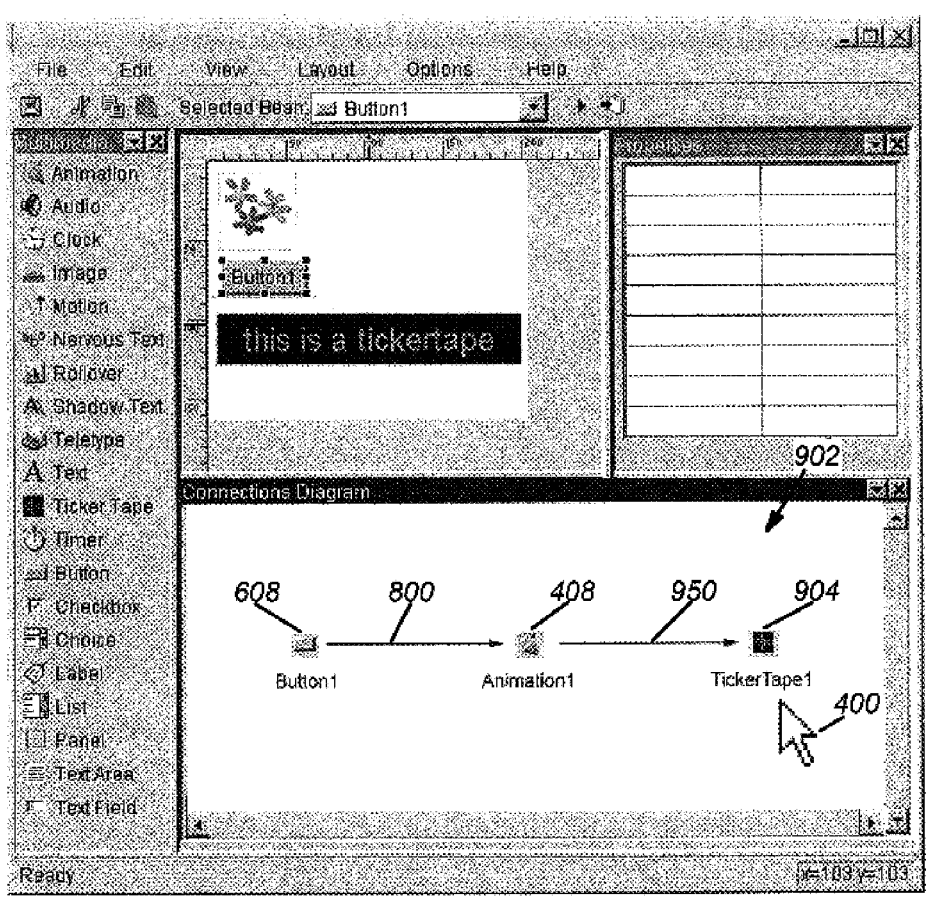

The present invention as illustrated in FIG. 3 describes a fully evolved relational diagram 300. The diagram 300 is fully editable and allows for the dropping of beans directly on the diagram as well as the creation of connections directly thereon. The diagram 300 is a viewport split into three columns which are not outwardly visible to the user:

1) A left column 302 is a tree view showing inputs (Who references me). This is drawn fully expanded and vertically centered.

2) A right column 304 is a tree view with the outputs (Who do I reference). This is drawn fully expanded and vertically centered.

3) The center column draws the selected bean's icon and name vertically centered and lines that show the left, center, and right look all connected together.

The entire panel has a vertical scroll bar 308 in cases where input and output trees are bigger than the available vertical space. In addition the entire area (all three columns) scrolls up and down together as one.

The procedure for visual programming using the relational diagram 300 of FIG. 3 entails the following steps as illustrated by FIGS. 4–11:

Load cursor 400 with a java bean, for example. Animation bean 402, from palette 404 and drop it anywhere over white space of center column 500 (FIG. 5) of a side-by-side relational diagram 502. If this is the first bean that has been dropped into the relational diagram, by default the bean is positioned in the center of the diagram. Subsequent beans may be dropped in any of the three columns. The user is given visual feedback as to which column they are dropping in by way of a highlight box appearing around the edges of the column as the mouse moves from column to column. A bean icon 408 is simply added with no connections. If the bean to be dropped is visual (i.e., animation), a visual bean 600 (FIG. 6) then pops into a Composer panel 602 at some pre-determined location.

The diagram is automatically centered on a new bean dropped. A visual cue is given to the user when the loaded cursor 400 moves over the center column, i.e., a rectangular highlight 504 (FIG. 5) is drawn around the center column 500 to indicate that clicking will drop a bean therein.

Next, load cursor 400 again with another bean, for example, Button bean 604, and drop it anywhere over the white space of a left column 606 (again, a rectangular highlight 610 is drawn around the left column 606 to indicate that clicking will drop a bean therein) of the diagram 502. This step adds a new bean icon 608 and begins a new connection from the bean just dropped to the center bean previously dropped:

A Connection pop-up 700 (FIG. 7) appears with the following details:
When 702: default event of the bean dropped in the left column 606;
Bean 704: name of the bean in the center column 500;
Do 706: default action of the bean in the center column 500;
Using 708: currently blank; and
Value 710: currently blank.

Note: the Using and Value fields are used to pass additional values into the connection—only certain beans and connections have these fields active, and their functions are not relevant to the present invention. The diagram stays centered on the center bean icon 408. As the loaded cursor 400 moves over the left column 606, a line 800 (FIG. 8) is drawn from the cursor 400 position pointing toward the center bean icon 408 to indicate that clicking will begin a new connection from the loaded bean 604, represented by the icon 608, to the center bean 402, represented by the icon 408.

The cursor 400 is loaded again with a bean, for example, Ticker Tape bean 900 (FIG. 9) and drop it anywhere over white space of a right column 902, as highlighted by a rectangular box 906 of the diagram 502. This adds a new bean icon 904 and begins a new connection from the center bean 402 (icon 408) to the bean 900 (icon 904) just dropped.

Another Connection pop-up 920 (FIG. 10) appears with the following details:
When 922: default event of the center bean 402;
Bean 924: name of the bean 900 just dropped;
Do 926: default action of the bean 900 just dropped;
Using 928: currently blank; and
Value 930: currently blank.

The diagram remains centered on the center bean 402 (icon 408). As the loaded cursor 400 moves over the right column 902 (FIG. 11), a line 950 is drawn from the center bean 402, as represented by icon 408, pointing toward the cursor 400 position to indicate that clicking will begin a new connection from the center bean 402 (icon 408) to the loaded bean 900, as represented by the icon 904.

The cursor 400 is loaded with another new bean and dropped over any bean icon in the diagram. This adds the new bean and also initiates a new connection from the bean which was just dropped to the bean it was dropped on. For example, if the user selects and loads the cursor with a button bean and proceeds to drop this button onto an animation player bean, the button is added to the relational diagram, and a connection from the button to the animation player is also initiated.

A Connection pop-up would appear with:
When: default event of the bean you dropped on
Bean: name of the bean you dropped
Do: default action of the bean you dropped
Using: <blank>
Value: <blank>

The diagram is centered to the bean just dropped on.
Visual cue: As the loaded cursor moves over any particular bean, a line is drawn from the bean the cursor is over to the beginning of the column to the bean's right with an arrow head pointing to the right to indicate that clicking will begin a new connection from the bean the cursor is over to the loaded bean.

To make further connections, right mouse click on any bean icon in the diagram to begin a new connection from the bean.

Connection pop-up appears with:
When: default event of the bean you clicked on
Bean: <blank>
Do: <blank>
Using: <blank>
Value: <blank>

The diagram is centered to the bean clicked on.

Visual cue: Just after accessing the pop-up, a line is drawn from the bean the pop-up is on to the beginning of the column to the bean's right with an arrow head pointing to the right to indicate that you are working on a new connection from the bean the pop-up is on to whichever bean you select as the target Bean of your connection.

An additional feature herein is "Double-click drill through". Double-clicking on a bean that is in the right or left column will cause that bean to become the current selected bean and scroll to the center of the diagram. The left and right columns are updated appropriately with the newly selected bean's inputs and outputs. Clipboard functionality of delete, cut, copy, and paste applies to the current selection and is another way to delete or duplicate beans and make connections. With this, non-visual beans are no longer shown in the Composer panel which frees up some screen real estate. If a non-visual bean is loaded and dropped over the Composer, the bean pops into the diagram in the center. This ensures the separation of visual connection lines from the visual composition itself since the composer window does not display the connection lines, only the relational connection diagram does. Thus the users WYSIWYG view of the application being developed is not visually polluted with connection lines.

Another feature herein is keeping the selection "in-synch". Selecting a bean in the Connections Diagram automatically selects that bean in the Composer. Conversely, selecting a bean in the Composer automatically selects and centers that bean in the Connection Diagram. This "keep in sync" feature ensures that the user only sees a limited view of the visual program at one time based on what is currently selected, thus cutting down on visual clutter.

Figure 12A:
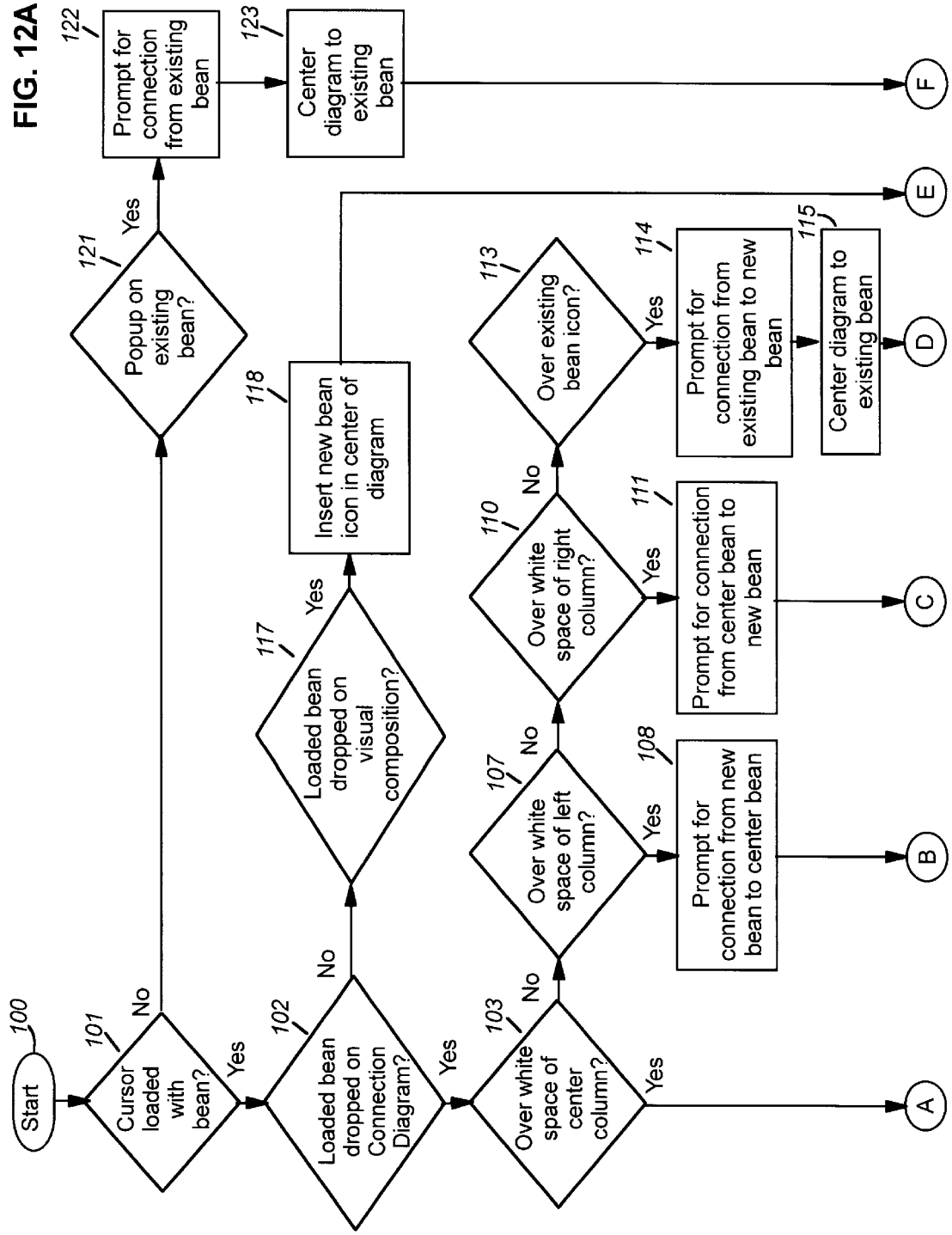
FIGS. 12A and 12B illustrate a flowchart of the procedure shown in FIGS. 4–11.
Figure 12B:
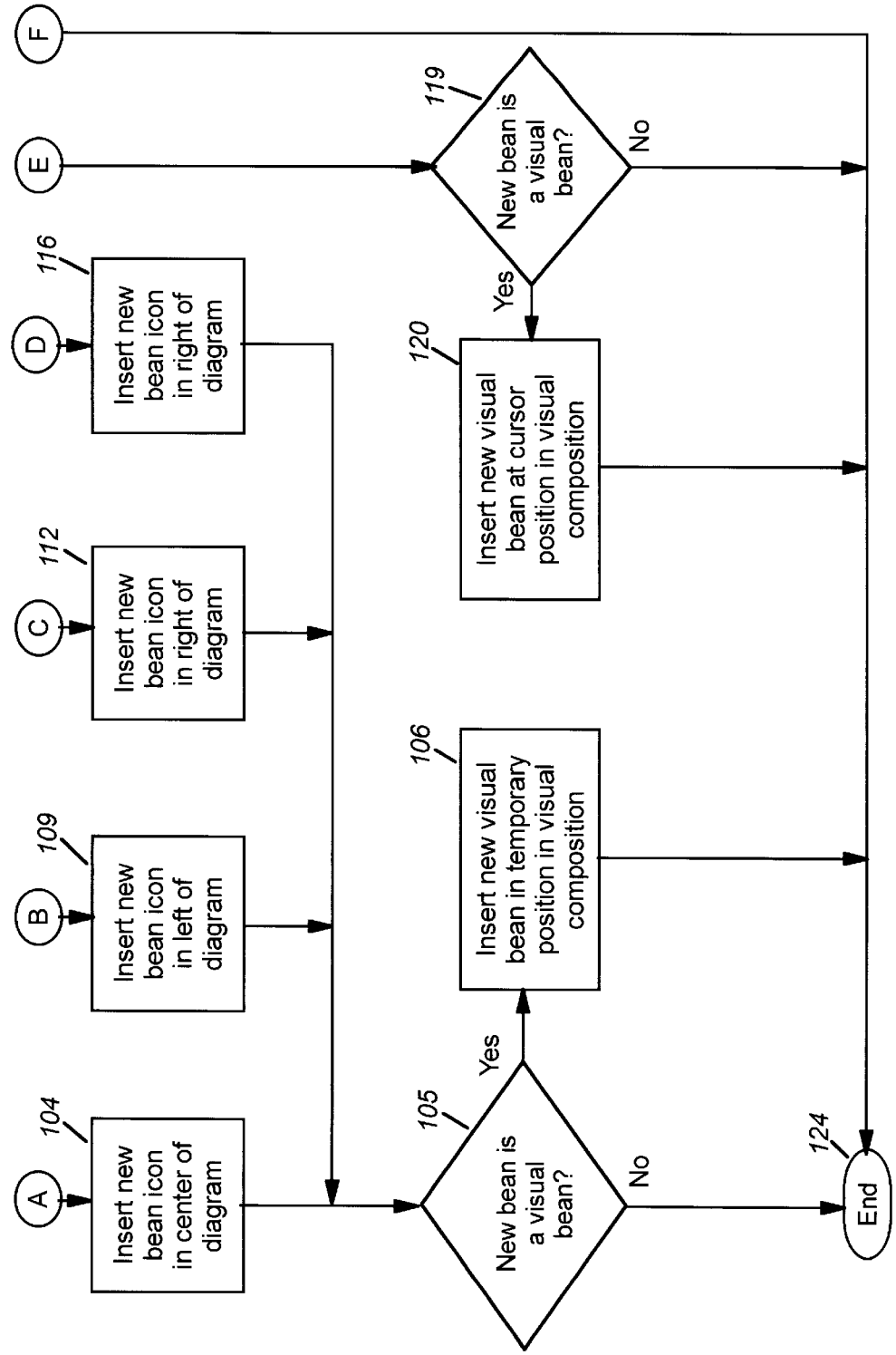

Referring to FIGS. 12A and 12B, a flowchart illustrates the present invention. After starting at block 100, it is determined at decision block 101 whether or not a cursor has been loaded with a bean. If the response to decision block 101 is no, it is determined at decision block 121 whether or not there is a pop-up on an existing bean. If the response to decision block 121 is yes, a prompt for connection from an existing bean occurs at block 122. The diagram is then centered to an existing bean at block 123 and the present invention ends at 124.

If the response to decision block 101 is yes, it is determined at decision block 102 whether or not a loaded bean was dropped on the connection diagram. If the response to decision block 102 is no, it is determined at decision block 117 whether or not the loaded bean was dropped on a visual composition. If the response to decision block 117 is yes, the new bean icon is inserted into the center of the diagram at block 118. It is then determined at decision block 119 whether or not the new bean is a visual bean. If the response to decision block 119 is no, the present invention ends at 124. If the response to decision block 119 is yes, a new visual bean is inserted at the cursor position in visual composition at block 120 followed by the present invention ending at 124.

If the response to decision block 102 is yes, it is determined at decision block 103 whether or not a loaded bean has been dropped over white space of the center column. If the response to decision block 103 is no, it is determined at decision block 107 whether or not the bean is dropped over white space of the left column. If the response to decision block 107 is yes, a prompt for connection from the new bean to the center been occurs at block 108. The new bean icon is inserted in the left column of the diagram at block 109.

If the response to decision block 107 is no, It is determined at decision block 110 whether or not the cursor is over white space of the right column. If the response to decision block 110 is yes, a prompt for connection from the center bean to the new bean occurs at block 111. The new bean icon is then inserted in the right column of the diagram at block 112.

If the response to decision block 110 is no, it is determined at decision block 113 whether or not the cursor is over an existing bean icon. Its response to decision block 113 is yes, a prompt for connection from the existing been to the new bean occurs at block 114. The diagram is centered to the existing bean at block 115 followed by insertion of the new bean icon in the right column of the diagram at block 116.

Subsequent to any of the actions in block 104, block 109, block 112, or block 116, it is determined If the decision block 105 whether or not the new bean is a visual bean. If the response to decision block 105 is yes, the new visual bean is inserted in a temporary position in visual composition at block 106. Subsequent to block 106 or if the response to decision block 105 is no, the present invention ends at 124.

It is to be noted that the decision blocks 113, 117 and 121 are not utilized herein in a conventional manner. The action in each is more of an assertion than an action and could be thought of as squares rather than as decision block diamonds. They are diamonds whose answer, if you get to that point, must be yes for the scope of the present invention.

The present invention provides a clear advantage to the visual programmer over the prior art. The interactive relational diagram allows the user to 1) see all connections from the perspective of a specific part, providing both what connects to the bean and what the bean connects to; 2) frees the visual composer from the clutter of showing connection lines to and from parts thus strengthening its use for visual positioning; 3) provides the user with fast paths to making connections on beans by allowing them to drop beans directly into the relational diagram and generating parts of the connection for them automatically; and 4) provides the user with the ability to drill down through connections within their application, thus giving a visual view of the logic flow.

Although the present invention has been described with respect to a specific preferred embodiment thereof, various changes and modifications may be suggested to one skilled in the art and it is intended that the present invention encompass such changes and modifications as fall within the scope of the appended claims.

What we claim is:

1. A method of visually programming with a relational diagram, comprising the steps of:
   structuring a relational diagram in a left-to-right format;
   providing a three column workspace in said relational diagram for display of said parts/beans of said software application, wherein the three column workspace categorizes inputs and outputs of a given part/bean; and
   placing parts/beans of a software application onto said relational diagram to illustrate an inherent visual flow of application logic.

2. The method of claim 1 further comprising the step of:
modifying said application logic when a user adds any one of said parts/beans directly to any one column of said three column workspace.

3. The method of claim 1 wherein the step of providing a three column workspace further comprises the steps of:
providing a center column for placement of a main one of said parts/beans;
providing a left most column for placement of other ones of said parts/beans which provide input to said main one of said parts/beans in said center column; and
providing a right most column for placement of still further ones of said parts/beans which receive output from said main one of said parts/beans in said center column.

4. The method of claim 3, further comprising the steps of:
double-clicking with any appropriate selection device any one of said parts/beans in said right most column or said left most column;
automatically scrolling said selected any one of said parts/beans to said center column;
automatically updating said left most column with parts/beans that provide input to said selected any one of said parts/beans now in said center column; and
automatically updating said right most column with parts/beans that receive output from said selected any one of said parts/beans now in said center column.

5. The method of claim 3, in which said relational diagram includes a composer panel and the method further comprises the steps of:
selecting any one of said parts/beans in said relational diagram; and
automatically selecting a same one of said parts/beans in the composer in order to synchronize said relational diagram with the composer panel.

6. The method of claim 3, in which said relational diagram includes a composer panel and the method further comprises the steps of:
selecting any one of said parts/beans in the composer; and
automatically selecting a same one of said parts/beans in said relational diagram in order to synchronize the composer panel with said relational diagram.

7. A system for visually programming software with a relational diagram, comprising:
means for structuring a relational diagram in a left-to-right format;
means for providing a three column workspace in said relational diagram for display of said parts/beans of said software application, wherein the three column workspace categories inputs and outputs of a given part/bean; and
means for placing parts/beans of a software application onto said relational diagram to illustrate an inherent visual flow of application logic.

8. The system of claim 7 further comprising:
means for modifying said application logic when a user adds at least one of said parts/beans directly to any one column of said three column workspace.

9. The system of claim 7 wherein said means for providing a three column workspace further comprises:
means for providing a center column for placement of a main one of said parts/beans;
means for providing a left most column for placement of other ones of said parts/beans which provide input to said main one of said parts/beans in said center column; and
means for providing a right most column for placement of still further ones of said parts/beans which receive output from said main one of said parts/beans in said center column.

10. The system of claim 9, further comprising:
means for double-clicking with any appropriate selection device any one of said parts/beans in said right most column or said left most column;
means for automatically scrolling said selected any one of said parts/beans to said center column;
means for automatically updating said left most column with parts/beans that provide input to said selected any one of said parts/beans now in said center column; and
means for automatically updating said right most column with parts/beans that receive output from said selected any one of said parts/beans now in said center column.

11. The system of claim 9, in which said relational diagram includes a composer panel and the system further comprises:
means for selecting any one of said parts/beans in said relational diagram; and
means for automatically selecting a same one of said parts/beans in the composer in order to synchronize said relational diagram with the composer panel.

12. The system of claim 9, in which said relational diagram includes a composer panel and the system further comprises:
means for selecting any one of said parts/beans in the composer; and
means for automatically selecting a same one of said parts/beans in said relational diagram in order to synchronize the composer panel with said relational diagram.

13. A computer program product recorded on computer readable medium for visually programming software with a relational diagram, comprising:
computer readable means for structuring a relational diagram in a left-to-right format;
computer readable means for providing a three column workspace in said relational diagram for display of said parts/beans of said software application, wherein the three column workspace categorizes inputs and outputs of a given part/bean; and
computer readable means for placing parts/beans of a software application onto said relational diagram to illustrate an inherent visual flow of application logic.

14. The program product of claim 13 further comprising:
computer readable means for modifying said application logic when a user adds at least one of said parts/beans directly to any one column of said three column workspace.

15. The program product of claim 13 wherein said computer readable means for providing a three column workspace further comprises:
computer readable means for providing a center column for placement of a main one of said parts/beans;
computer readable means for providing a left most column for placement of other ones of said parts/beans which provide input to said main one of said parts/beans in said center column; and
computer readable means for providing a right most column for placement of still further ones of said parts/beans which receive output from said main one of said parts/beans in said center column.

16. The program product of claim 15, further comprising:

computer readable means for double-clicking with any appropriate selection device any one of said parts/beans in said right most column or said left most column;

computer readable means for automatically scrolling said selected any one of said parts/beans to said center column;

computer readable means for automatically updating said left most column with parts/beans that provide input to said selected any one of said parts/beans now in said center column; and computer readable means for automatically updating said right most column with parts/beans that receive output from said selected any one of said parts/beans now in said center column.

17. The program product of claim 15, in which said relational diagram includes a composer panel, the program product further comprises:

computer readable means for selecting any one of said parts/beans in said relational diagram; and computer readable means for automatically selecting a same one of said parts/beans in the composer in order to synchronize said relational diagram with the composer panel.

18. The program product of claim 15, in which said relational diagram includes a composer panel, the program product further comprises:

computer readable means for selecting any one of said parts/beans in the composer; and computer readable means for automatically selecting a same one of said parts/beans in said relational diagram in order to synchronize the composer panel with said relational diagram.

* * * * *